(No Model.)

C. A. MAYNARD.
METHOD OF MAKING SHOVELS, &c.

No. 391,259. Patented Oct. 16, 1888.

WITNESSES:
C. M. Newman,
H. C. Newman,

INVENTOR,
Charles A. Maynard,
By his Attorneys
Baldwin Hopkins & Peyton.

UNITED STATES PATENT OFFICE.

CHARLES A. MAYNARD, OF NORTHAMPTON, MASSACHUSETTS.

METHOD OF MAKING SHOVELS, &c.

SPECIFICATION forming part of Letters Patent No. 391,259, dated October 16, 1888.

Application filed February 13, 1888. Serial No. 263,816. (No model.)

*To all whom it may concern:*

Be it known that I, CHARLES A. MAYNARD, of Northampton, in the county of Hampshire and State of Massachusetts, have invented a certain new and useful Method of Making Shovels or other Tools, of which the following is a specification, reference being had to the accompanying drawings.

The object of my invention is to provide a simple method by which sockets in metal tools can be rapidly and conveniently made by the use of machinery.

Figure 1:
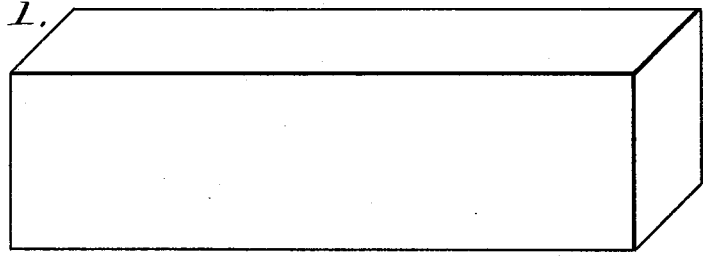
Figure 2:
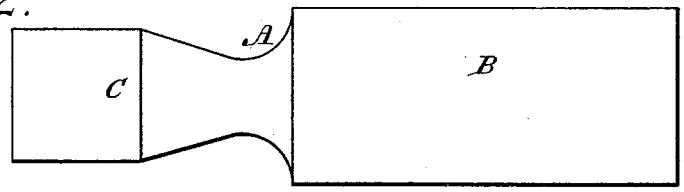
Figure 3:
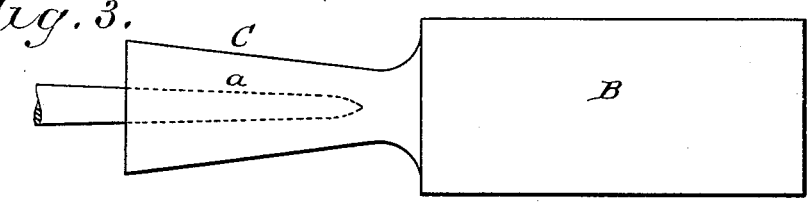
Figure 4:
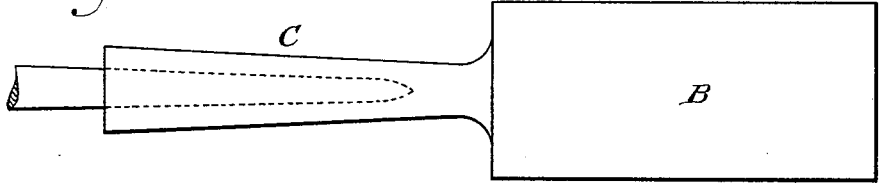
Figure 5:
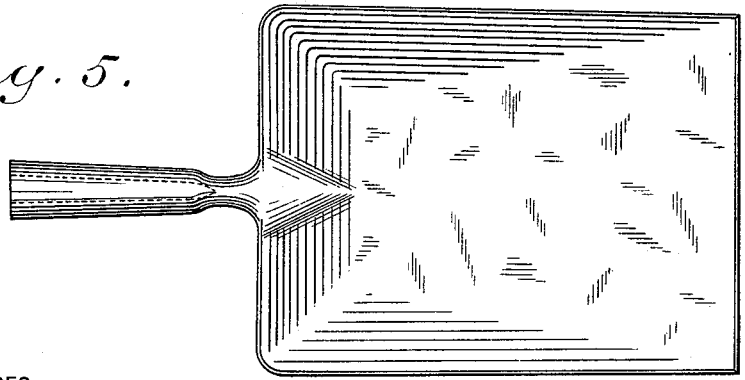

In the accompanying drawings, Figure 1 is a metal blank suitable for making a shovel or spade, of which the blade, shank, and socket shall be integral. Fig. 2 represents a blank partially shaped for the purpose of illustrating the practice of my process. Fig. 3 represents a blank with the hole for the mandrel; Fig. 4, the blank with the shank and socket completed. Fig. 5 is a view of the completed shovel.

The drawings are diagram sufficient to illustrate my improved method. They do not show the exterior size of blank used or the relative sizes of the blank in different stages of the process.

I take such a blank as shown in Fig. 1 and forge or otherwise suitably shape it at one end, so as to form a neck, A, Fig. 2, the part B being for the shovel-blade and the part C being the material for the shank and socket. When forged in this shape, I clamp it between dies. I then drive a tapering pin, preferably of steel, into the end of the part C to partially form a socket, *a*, Fig. 3, or, rather, an opening for the socket-forming mandrel. I then insert a pin or mandrel of the proper size and shape for the socket-opening and roll the stock upon the mandrel, so as to spread it and shape it into a hollow cylinder around the mandrel, and thus form the socket in the metal for the wooden handle, and finish the exterior of the socket, as shown in Fig. 4. Afterward I roll the metal out into proper shape and finish it for the blade of a shovel or the cutting part of any tool, as shown in Fig. 5.

Having described my improved method, what I claim to be new, and desire to secure by Letters Patent of the United States, is—

The method of manufacturing shovels and other tools from a single piece of metal herein described, which consists in taking a suitable blank, forging it down or otherwise suitably shaping it to form a blank for the shank and socket, then clamping it between suitable dies and driving a pin into the end of the metal, C, to make a hole for a mandrel, then inserting the mandrel and rolling the metal around the mandrel to form and finish the socket part, and rolling out the blade or cutting part of the tool, substantially as set forth.

In testimony whereof I have hereunto subscribed my name.

CHARLES A. MAYNARD.

Witnesses:
H. M. ABBOTT,
WM. H. CLAPP.